US012757880B2

(12) United States Patent
Shim

(10) Patent No.: US 12,757,880 B2
(45) Date of Patent: Oct. 13, 2026

(54) FISHING SWIVEL WITH INTERNAL RATTLE

(71) Applicant: CENTRO CORPORATION, Goyang-si (KR)

(72) Inventor: Woo Gil Shim, Goyang-si (KR)

(73) Assignee: CENTRO CORPORATION, Goyang-si (KR)

( * ) Notice: Subject to any disclaimer, the term of this patent is extended or adjusted under 35 U.S.C. 154(b) by 0 days.

(21) Appl. No.: 19/221,699

(22) Filed: May 29, 2025

(65) Prior Publication Data

US 2026/0174072 A1 Jun. 25, 2026

(30) Foreign Application Priority Data

Dec. 23, 2024 (KR) ........................ 10-2024-0193890

(51) Int. Cl.
*A01K 91/047* (2006.01)
*A01K 85/01* (2006.01)

(52) U.S. Cl.
CPC .......... *A01K 91/047* (2013.01); *A01K 85/017* (2022.02)

(58) Field of Classification Search
CPC .... A01K 91/04; A01K 91/047; A01K 85/017; G10K 3/00
See application file for complete search history.

(56) References Cited

U.S. PATENT DOCUMENTS 794,979 A * 7/1905 Haverly ................ F16B 45/045 24/600.6
1,532,150 A * 4/1925 Olson ..................... E21B 19/00 294/215
1,589,863 A * 6/1926 Robin .................. A01K 91/053 59/95
1,766,532 A * 6/1930 Pflueger ................. A01K 91/03 59/95
1,771,125 A * 7/1930 Kahle ..................... A01K 91/03 24/116 R
1,814,609 A * 7/1931 Smith ..................... F16G 11/08 24/299
1,870,559 A * 8/1932 Drake ..................... A01K 85/16 43/42.22
2,040,790 A * 5/1936 Kaufmann ........... D03C 9/0683 403/78
2,108,598 A * 2/1938 Burr ....................... A01K 91/04 43/44.84

(Continued)

FOREIGN PATENT DOCUMENTS

CN 108575935 A * 9/2018 ........... A01K 91/047
CN 116784291 A * 9/2023 ............. A01K 91/04

(Continued)

*Primary Examiner* — Morgan T Jordan

(74) *Attorney, Agent, or Firm* — LEX IP MEISTER, PLLC

(57) ABSTRACT

A fishing swivel with a main body having ring means connected to both ends, respectively, for attaching a lure to a fishing line is provided. Necks of ring means are rotatably supported in a through hole in a main body, so that the ring means may each independently rotate, and an end portion of the neck is provided as a blunt hammer. An inside of the main body is formed as a space, and a tubular body and a bead are built-in in this space. The tubular body and the bead produce a sound to attract fish by striking the hammers of both ends in a space of the main body, thereby serving as a rattle.

6 Claims, 12 Drawing Sheets

(56) References Cited

U.S. PATENT DOCUMENTS

| | | | | | |
|---|---|---|---|---|---|
| 2,145,992 | A * | 2/1939 | Parker | A01K 91/04 | 43/42.74 |
| 2,438,548 | A * | 3/1948 | Ehmann | F16G 15/08 | 74/502.6 |
| 2,466,243 | A * | 4/1949 | Johnson | A01K 91/03 | 59/95 |
| 2,763,089 | A * | 9/1956 | Mcdonald | A01K 91/04 | 403/353 |
| 2,903,283 | A * | 9/1959 | Arthur | F16G 11/12 | 403/44 |
| 2,962,129 | A * | 11/1960 | Walton | F16G 11/06 | 52/149 |
| 3,133,756 | A * | 5/1964 | Stanwick | F16G 15/08 | 43/42.49 |
| 3,148,423 | A * | 9/1964 | Anspach | A01K 91/04 | 403/209 |
| 3,284,944 | A * | 11/1966 | Settle | A01K 85/18 | 43/42.15 |
| 3,332,163 | A * | 7/1967 | Stewart | A01K 85/00 | 403/353 |
| 3,354,523 | A * | 11/1967 | Roche | A01K 91/04 | 24/682.1 |
| 3,461,596 | A * | 8/1969 | Green | A01K 93/00 | 43/44.84 |
| 3,750,240 | A * | 8/1973 | Fridrich | A01K 91/04 | 24/601.3 |
| 3,754,347 | A * | 8/1973 | McGahee | A01K 91/04 | 43/44.83 |
| 3,777,046 | A * | 12/1973 | Schiavone | H02G 7/125 | 174/42 |
| 3,834,061 | A * | 9/1974 | Klein | A01K 91/047 | 43/44.9 |
| 3,848,353 | A * | 11/1974 | McClellan | A01K 85/01 | 43/42.31 |
| 3,854,233 | A * | 12/1974 | Browning, III | A01K 85/00 | 43/42.31 |
| 3,857,645 | A * | 12/1974 | Klein | F16G 11/02 | 289/1.5 |
| 3,894,350 | A | 7/1975 | Parker | | |
| 4,030,225 | A * | 6/1977 | Earley | A01K 91/04 | 43/42.49 |
| 4,064,604 | A * | 12/1977 | Hartman | A01K 91/04 | 24/907 |
| 4,133,134 | A * | 1/1979 | Cheng | A01K 85/01 | 43/42.06 |
| 4,235,037 | A * | 11/1980 | Sivertsen | A01K 95/00 | 43/44.91 |
| 4,369,551 | A * | 1/1983 | Heredia | A01K 91/047 | 43/43.1 |
| 4,571,874 | A * | 2/1986 | Smaw | A01K 93/00 | 43/4.5 |
| 4,630,389 | A * | 12/1986 | Higgins | A01K 85/01 | 43/42.22 |
| 4,638,584 | A * | 1/1987 | Lindsay | A01K 85/01 | 43/42.31 |
| 4,646,463 | A * | 3/1987 | Koch | A01K 85/16 | 43/42.31 |
| 4,669,907 | A * | 6/1987 | Patton | F16G 15/08 | 403/348 |
| 4,791,750 | A * | 12/1988 | Gammill | A01K 85/01 | 43/42.31 |
| 4,823,497 | A * | 4/1989 | Pierce | A01K 85/01 | 43/44.99 |
| 4,870,776 | A * | 10/1989 | Schock | A01K 85/16 | 43/42.47 |
| 5,001,856 | A * | 3/1991 | Gentry | A01K 85/01 | 43/42.31 |
| 5,018,297 | A * | 5/1991 | Kennedy, Jr. | A01K 85/01 | 43/42.31 |
| 5,024,019 | A * | 6/1991 | Rust | A01K 85/01 | 43/42.31 |
| 5,036,617 | A * | 8/1991 | Waldrip | A01K 85/01 | 43/42.31 |
| 5,142,811 | A * | 9/1992 | Freeman | A01K 85/00 | 43/42.24 |
| 5,144,765 | A * | 9/1992 | Keeton | A01K 85/01 | 43/42.31 |
| 5,201,784 | A * | 4/1993 | McWilliams | A01K 85/01 | 43/42.31 |
| 5,361,532 | A * | 11/1994 | Moff | A01K 93/00 | 43/44.9 |
| 5,381,622 | A * | 1/1995 | Tregre | A01K 85/01 | 43/42.31 |
| 5,406,739 | A * | 4/1995 | Lu | A01K 95/005 | 43/44.9 |
| 5,499,471 | A * | 3/1996 | Foutch | A01K 85/01 | 43/42.31 |
| 5,517,782 | A * | 5/1996 | Link | A01K 85/00 | 43/44.8 |
| 5,647,616 | A * | 7/1997 | Hamilton | A01K 97/06 | 289/17 |
| 5,829,183 | A * | 11/1998 | Guerin | A01K 85/18 | 43/42.31 |
| 5,890,315 | A * | 4/1999 | Norton | A01K 85/14 | 43/42.31 |
| 6,564,500 | B1 * | 5/2003 | Ames | A01K 91/047 | 43/43.12 |
| 6,601,336 | B1 * | 8/2003 | Link | A01K 85/00 | 43/42.11 |
| 6,651,376 | B1 * | 11/2003 | Link | A01K 85/01 | 43/42.31 |
| 6,671,996 | B1 * | 1/2004 | Ito | A01K 85/16 | 43/42.31 |
| 6,978,571 | B1 * | 12/2005 | Nemire | A01K 85/12 | 43/42.31 |
| 7,513,075 | B2 * | 4/2009 | Garber | A01K 91/03 | 403/112 |
| 8,172,476 | B2 * | 5/2012 | Berney | F16G 15/08 | 403/164 |
| 2005/0034356 | A1 * | 2/2005 | Blette | A01K 91/047 | 43/44.9 |
| 2005/0039376 | A1 * | 2/2005 | Blette | A01K 91/047 | 43/43.1 |
| 2005/0235549 | A1 * | 10/2005 | Griss | A01K 83/06 | 43/42.06 |
| 2005/0241213 | A1 * | 11/2005 | Garber | A01K 91/03 | 43/21.2 |
| 2006/0000138 | A1 * | 1/2006 | Druk | A01K 91/053 | 43/42.19 |
| 2006/0156612 | A1 * | 7/2006 | Brzozowski | A01K 95/02 | 43/43.15 |
| 2007/0031183 | A1 * | 2/2007 | Sim | A01K 91/047 | 403/78 |
| 2007/0080623 | A1 * | 4/2007 | Limura | G10K 3/00 | 313/483 |
| 2007/0107295 | A1 * | 5/2007 | Kaptis | A01K 85/16 | 43/42.22 |
| 2007/0107296 | A1 * | 5/2007 | Hollomon | A01K 85/01 | 43/42.31 |
| 2008/0155885 | A1 * | 7/2008 | Corbitt | A01K 91/04 | 43/43.12 |
| 2009/0126256 | A1 * | 5/2009 | Gregory | A01K 85/00 | 43/42.15 |
| 2009/0255170 | A1 * | 10/2009 | Garber | A01K 95/02 | 403/112 |
| 2011/0096539 | A1 * | 4/2011 | Sim | A01K 91/18 | 362/231 |
| 2012/0023806 | A1 * | 2/2012 | Henry, Jr. | A01K 91/04 | 43/43.1 |
| 2013/0036654 | A1 * | 2/2013 | Goosey | A01K 85/16 | 43/42.31 |
| 2013/0180160 | A1 * | 7/2013 | Petherick | A01K 91/047 | 29/515 |
| 2016/0113257 | A1 * | 4/2016 | Harrington | A01K 85/01 | 43/42.31 |
| 2019/0313617 | A1 * | 10/2019 | Coxey | A01K 85/14 | |

(56) References Cited

U.S. PATENT DOCUMENTS

| | | | | |
|---|---|---|---|---|
| 2021/0195883 | A1* | 7/2021 | Want | A01K 85/12 |
| 2021/0267183 | A1* | 9/2021 | Pramann | A01K 85/01 |
| 2021/0386043 | A1* | 12/2021 | Yamane | A01K 85/16 |

FOREIGN PATENT DOCUMENTS

| | | | | | |
|---|---|---|---|---|---|
| DE | 20005234 | U1 | * | 5/2000 | A01K 91/04 |
| GB | 2237038 | A | * | 4/1991 | A01K 91/047 |
| GB | 2411560 | A | * | 9/2005 | A01K 91/047 |
| JP | H10-191839 | | | 7/1998 | |
| JP | H10-248441 | | | 9/1998 | |
| JP | 2002-218865 | | | 8/2002 | |
| KR | 970004022 | Y1 | * | 4/1997 | A01K 91/053 |
| KR | 0136827 | Y1 | * | 2/1999 | A01K 91/04 |
| KR | 200202722 | Y1 | * | 11/2000 | A01K 97/06 |
| KR | 200379310 | Y1 | * | 3/2005 | A01K 91/04 |
| KR | 20090005496 | U | * | 6/2009 | A01K 91/03 |
| KR | 20150044586 | A | * | 4/2015 | A01K 93/00 |
| KR | 20170057033 | A | * | 5/2017 | A01K 93/02 |
| KR | 200490130 | Y1 | * | 9/2019 | A01K 97/00 |
| KR | 20-2020-0000221 | | | 1/2020 | |
| KR | 20210000937 | A | * | 1/2021 | A01K 91/06 |
| WO | WO-0162077 | A1 | * | 8/2001 | A01K 85/12 |
| WO | WO-2018003354 | A1 | * | 1/2018 | A01K 85/16 |

* cited by examiner

FISHING SWIVEL WITH INTERNAL RATTLE

CROSS-REFERENCE TO RELATED APPLICATION

This application claims priority to and the benefit of Korean Patent Application No 10-2024-0193890 filed with the Korean Intellectual Property Office on Dec. 23, 2024, the entire contents of which are incorporated herein by reference.

BACKGROUND OF THE INVENTION

(a) Field of the Invention

The present disclosure relates to fishing swivel that are connected between fishing lines of a fishing rod and leaders of fishing rigs to prevent these lines from getting backlashed, and more particularly, to a fishing swivel with internal rattles that produces a rattling sound from the fishing swivel whenever a fishing rod is cast or an action is taken in lure fishing.

(b) Description of the Related Art

Various types of fishing swivels that prevent fishing lines from getting backlashed have been introduced commercially, and a common feature of these products is that a pivot hook to which the fishing lines are connected is connected to an axis so that it may rotate freely with respect to a main body.

A typical example is the following Patent Document 1 proposed by H. FRANZEN, which shows a configuration in which a flange is formed at one end of a pivot pin extending through upper and lower ends of a ring body with a center hole, so that the pivot pin may rotate freely with respect to a main body.

In addition, the Patent Document 2 proposed by Y. OKISHIMA shows a configuration in which one end of a pivot hook penetrates into a longitudinal direction of a cylindrical main body, and an end of the hook forms a stopper on the flange inside the main body, so that it is also represented as a configuration integrally connected to allow free rotation.

Meanwhile, equipment used for lure fishing includes rattles that attract target fish species audibly, glitters that attract the fish species visually, and lures that mimic movements of baits in the shape of preferred fish or injured fish.

Among them, the rattles are used by attaching one or more balls to one of the fishing rigs so that they may move freely inside the tubular body, but as an advanced example, as described in the following Patent Document 3 proposed by P. ZERNOV, there is also known a magnetic rattle system in which a magnet and a lure piece are arranged on a rod-shaped support, and a magnetic force of a magnet induces the axial movement of the lure piece, thereby producing a sound when they collide with each other.

Meanwhile, in the case of the lures, various things are known that may reduce the inconvenience of fishing rigs by having a rattle inside.

The lure disclosed in the following Patent Document 4 proposed by E. GRAMSE, JR is an example of a lure with an internal rattle, and shows an example in which a rattle has a chamber provided inside the tubular body, and a large number of spherical sinkers are built-in in the chamber, which is integrally attached to a spinner blade.

The disclosed lure is provided with an eyelet in each longitudinal direction so that it may be interposed between the fishing line and the fishing hook, causing the spherical sinker in the chamber to move internally during the lure action and to generate noise.

In addition, the Patent Document 5 proposed by W. CRIHFIELD discloses a rattle fishing lure which is composed of a plastic shell assembly having two chambers each containing a plurality of metal balls, and in which, when the lure is pulled into the water and the metal balls in the chamber move, noise is generated to attract fish, and this type of lure may be used alone or integrated with other types of lures or live bait.

In addition, Patent Document 6 proposed by HURUYA discloses a fishing hook with internal rattles and heavy sinkers in which chambers are provided on both sides of a stem of the fishing hook and have a conically sunken wall surface to form a concave obtuse angle, and further, the heavy sinkers built-in in the chamber integrally have an acute-angled conical protrusion that matches an obtuse-angled conical wall surface, so the acute-angled conical protrusion rotates around the apex within the obtuse-angled cone and generates a collision sound.

On the other hand, Patent Document 7 proposed by TOMAS VERNON discloses a fishing hook in which a tubular chamber containing a rattle is coaxially attached and fixed to the stem portion, so as to generate noise during casting and action.

However, an example of a swivel that should be equipped with a fishing rig has not been proposed so far that the swivel has an integral rattle.

The general structure of the swivel used so far is that rings attached to both ends of a hollow main body are connected so as to be rotatable, and the hollow main body is pivoted at the shaft connection so as to allow relative rotation of the two rings. Also, as a type of swivel, a structure in which ball bearings are provided on one or both sides of the hollow main body is known, but this method has a structural difference in that a race is formed to support the ball bearing in the ring connected to the part where the ball bearing is provided, but this also only exhibits the function of connecting the two rings so that they may rotate freely with respect to each other.

Therefore, in the past, when fishing, in order to use a rattle, there is only a method for mounting a lure, sinkers, and a fishing hook on a swivel of a fishing rig, mounting a rattle on a lure or a sinker, replacing the existing lure with a lure with an internal rattle, or replacing a fishing hook with a fishing hook with an internal rattle.

However, attaching a rattle to a lure or sinkers requires a separate rattle, which is inconvenient, and there is the problem that the rattle may fall off and be lost during fishing. In addition, since a main body of a lure with an internal rattle is usually made of soft plastic, there is a problem that noise caused by the rattle is reduced internally, making it difficult to expect a fish-attracting effect, and since the main body is made of metal, processing should be performed to create a space for installing the rattle internally, which increases the manufacturing cost.

In the case of the fishing hook with a rattle mounted on the stem, when the space for accommodating the rattle is formed on the outside of the stem, the space is limited, so the rattle effect is weak and the generated sound is small. Also, when the chamber is mounted coaxially on the stem, the joint between the stem and the chamber becomes a weak part, so there is a risk that the part may be easily cut by the struggle of the fish that has been caught.

RELATED ART DOCUMENT

Patent Document (Patent Document 1) U.S. Pat. No. 2,137,016
(Patent Document 2) U.S. Pat. No. 11,382,320
(Patent Document 3) U.S. Pat. No. 6,301,822
(Patent Document 4) U.S. Pat. No. 5,870,850
(Patent Document 5) U.S. Pat. No. 4,995,189
(Patent Document 6) Japanese Patent Laid-Open No. 2001-28970
(Patent Document 7) U.S. Pat. No. 10,136,623

SUMMARY OF THE INVENTION

The present disclosure attempts to provide a fishing swivel with an internal rattle capable of simply solving the inconvenience of fishing using a rattle as described above and generating a sound with enough volume to attract fish.

In addition, the present disclosure attempts to provide a fishing swivel with an internal rattle in which a sound of the rattle received in an internal space is generated at an optimal volume through the use of various structures and materials.

According to an embodiment of the present disclosure, a fishing swivel with an internal rattle includes a main body having through holes formed on both side ends thereof and a space inside, a tubular body axially movably built-in in the space of the main body, and a ring means in which a neck is pivotally supported in through holes on both sides of the main body, and an end of the neck is formed as a hammer.

In the characteristic configuration of the present disclosure described above, one or both necks of the ring means connected to two through holes of the main body may be configured to be supported by retainers installed around the through holes of the main body, and at the same time, the necks may be configured to be supported by ball bearings configured to build-in a plurality of balls between the retainers and the hammers of the neck.

In addition, in the characteristic configuration of the present disclosure, the tubular body may be a barrel shape in which both ends are open and a diameter is gradually decreasing from a middle to both ends.

In addition, in the characteristic configuration of the present disclosure, the tubular body built-in in the main body may be configured such that both ends are open and one bead is added to an outside of the tubular body, or one bead is added to an inside of the tubular body together with the bead on the outside.

In addition, in the characteristic configuration of the present disclosure, the tubular body built-in in the space of the main body may have at least one bead or a pair of beads built-in therein, and both ends of the tubular body may be closed by a sealant made of a metal ball or thermoplastic resin.

In addition, in the characteristic configuration of the present disclosure, the tubular body built-in in the space of the main body may be a bottomed injection-molded product in which an inner bead is built-in, and an opening on one side of the tubular body is fitted with an injection-molded cap serving as a sealant, so that the tubular body and the injection-molded cap are joined by ultrasonic welding.

In addition, in the characteristic configuration of the present disclosure, the main body having the tubular body, in which one bead is built-in, and provided inside thereof and another main body with the tubular body having one bead additionally built-in on the outside of the tubular body in which one bead is built-in may be configured in a row by a link.

In addition, in the characteristic configuration of the present disclosure, the pair of main bodies connected in a row by the link may also be implemented in a configuration in which a pair of beads is built-in inside an open tubular body built-in in each internal space.

In addition, in the characteristic configuration of the present disclosure, the bead may be made of one selected from tungsten, stainless steel, plastic, and ceramic In addition, in the characteristic configuration of the present disclosure, the tubular body may be made of one selected from the group consisting of ABS resin, polycarbonate, polyvinyl chloride, impact-resistant polystyrene, 6 nylon, polypropylene, high-density polyethylene, polyacetal resin, and polytetrafluoroethylene.

In addition, in the characteristic configuration of the present disclosure, the thermoplastic resin closing the end of the tubular body may be a polyacetal resin.

In addition, in the characteristic configuration of the present disclosure, an outer diameter of the bead may be not particularly limited, but may be in the range of 0.8 to 0.89 with respect to a maximum inner diameter of the tubular main body, and the maximum outer diameter of the tubular body may be in the range of 0.88 to 0.93 with respect to the inner diameter of the main body.

In addition, the present disclosure may be implemented in a configuration in which the hollow main body with the through hole may be formed on both sides and an interior space, the bead having the outer diameter in the range of 0.88 to 0.93 with respect to the inner diameter of the main body may be built-in in the space of the main body in one or a pair, and the neck of the ring means is shaft-supported in the through hole of the main body and the end is formed as a blunt hammer.

According to the fishing swivel with an internal rattle of the present disclosure described above, when casting and taking action during fishing, the axial movement of the open tubular body inside the main body of the swivel connected to the fishing line is caused, and the two ends thereof collide with the corresponding ring means or the neck-side hammer of the ball bearing, respectively, to generate noise to attract the attention of the fish, thereby attracting the fish with the sound.

This effect is equivalent to the fish-attracting effect obtained by using the conventional fishing rattle, but the present disclosure has the advantage of obtaining the fish-attracting effect by the rattle during fishing even when using only basic fishing gear that connects the sinker, the lure, the fishing hook, etc., to the swivel without the existing rattle.

In addition, according to the fishing swivel with an internal rattle of the present disclosure, the noise that attracts fish is generated when the barrel-shaped tubular body, which is axially movable and built-in inside the main body, collides with the hammer of the ring means, and since the tubular body has the barrel-shaped cross-section, the vibration waves that occur along its surface appear with different wavelengths depending on the location, thereby causing the wave interference (wave interference: For the physical phenomenon of the wave interference, see the attached English version of sound interference file) to generate the considerable volume of sound.

In addition, in the fishing swivel with an internal rattle of the present disclosure, by adopting the tubular body with both ends closed with the metal ball or the thermoplastic resin and the beads built-in inside causes two types of collision sounds, when the tubular body collides with the hammer on the inside of the main body, and when the beads collide with both ends inside the tubular body, the two types of collision sounds coexist and cause wave interference, which can produce a considerable amount of sound.

Other objects and advantages of the present disclosure will become apparent from the following detailed description taken in conjunction with the accompanying drawings that present specific embodiments of the present disclosure.

DETAILED DESCRIPTION OF THE EMBODIMENTS

Hereinafter, preferred embodiments of the present disclosure will be described in detail with reference to the attached drawings.

However, it should be understood that the disclosed embodiments are merely examples of the present disclosure that may be embodied in various forms.

Therefore, the details disclosed in this specification should not be construed as limiting, but should be construed merely as a basis for suggesting to those skilled in the art how to make and/or how to use the invention.

Figure 1:
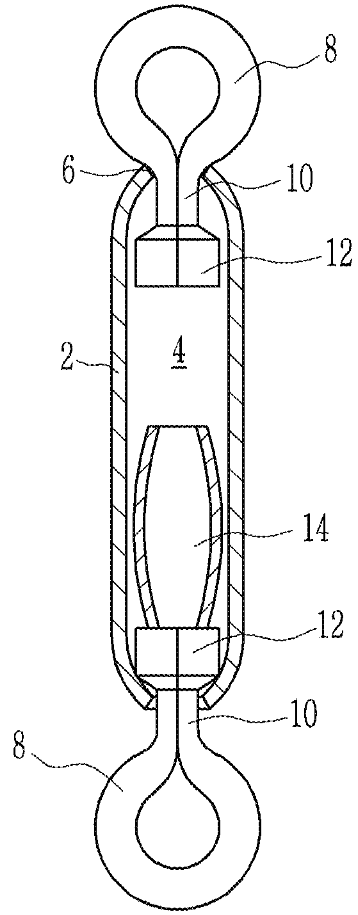
FIG. 1 is a cross-sectional structural diagram of a first embodiment related to a fishing swivel with an internal rattle of the present disclosure.

FIG. 1 is a diagram illustrating a first embodiment of a fishing swivel with an internal rattle related to the present disclosure, in which a main body 2 of the fishing swivel has a space 4 inside and a structure in which through holes 6 are formed at both ends thereof.

The through holes 6 are actually formed through a process of plastically deforming an end portion of a body material in a shape of a pipe by a tube drawing process.

More specifically, a neck 10 of a ring means 8 is inserted into one end of the main body 2 before processing, and the end portion is pressed with a processing tool while rotating to cause plastic deformation, so that the end portion of the main body 2 is reduced and transformed into the through hole 6 that supports the neck 10 and pivotally supports the ring means 8.

The part of the neck 10 of the ring means 8 facing the inside of the main body 2 is formed as a blunt hammer 12, and a tubular body 14 is built-in in the space 4 of the main body 2.

In this embodiment, the tubular body 14 is open at both ends without being sealed, and its outer shape is a barrel shape with a diameter that becomes smaller from the middle to both ends.

In the barrel-shaped tubular body 14, it is preferable to set the maximum outer diameter to a size slightly smaller than the inner diameter of the main body 2, and preferably, although not particularly limited, to a range of 0.82 to 0.93.

As a result, the tubular body 14 does not tilt sideways when reciprocating within the main body 2, so that the entire end surface may come into contact with the hammer 12.

The method for using a fishing swivel with an internal rattle of the present disclosure described above is also similar to the conventional method, in which one side of the ring means 8 on both sides is tied to a fishing line and the other side is connected to a fishing rigs equipped with a sinker, a lure, a fishing hook, etc.

A fisherman manipulates a fishing rod by hopping, twitching, jerking, shaking, dragging, (walking the dog) to show movements appropriate to the type of lure used, and thus attracts fish. Whenever the fishing rod is manipulated in this manner, the fishing swivel with an internal rattle according the present disclosure generates noise that attracts fish.

In this embodiment, the tubular body 14 reciprocates axially inside the main body 2 and the entire end thereof collides with the hammer 12 of the corresponding neck 10, thereby resonating with proper vibration to generating a rattling sound.

Such resonance of the tubular body 14 generates sounds of different wavelengths depending on the location on its surface, and as a result, a wave interference effect occurs, thereby generating the considerable volume of sound.

Therefore, when using the fishing swivel with an internal rattle according to the present disclosure, since the sound generated by the tubular body 14 colliding with the hammer 12 as described above may be used to attract fish, there is an advantage in that even a fishing tool without an existing rattle may exhibit the effect of attracting fish with sound.

Figure 2:
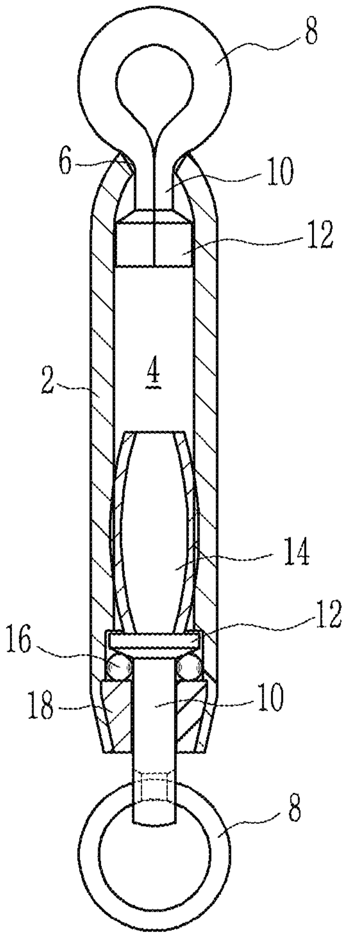
FIG. 2 is a cross-sectional structural diagram illustrating a modified example of the first embodiment related to the fishing swivel with an internal rattle of the present disclosure.

FIG. 2 is a cross-sectional structural diagram illustrating a modified example of the first embodiment related to the fishing swivel with an internal rattle of the present disclosure.

The main body 2 of this embodiment also has a space 4 inside and a barrel-shaped open tubular body 14 built-in therein, and one ring means 8 of the main body 2 has a structure in which the neck 10 bearing on the through hole 6 and the hammer 12 at the end are integrally provided, but the only difference is that the neck 10 of the opposite ring means 8 is supported by a ball bearing method that penetrates through and supports a retainer 18 that supports a ball 16 together with the hammer 12.

A modified example of the illustrated structure is that since one ring means 8 is supported in a ball bearing manner, the relative pivoting between the two ring means 8 becomes smoother and softer, so that it is particularly suitable for fishing large fish species that exhibit a phenomenon in which the fishing line is sharply backlashed during fishing, and the effect of attracting fish with sound without the conventional rattle may be obtained in the same manner as in the embodiment.

Figure 3:
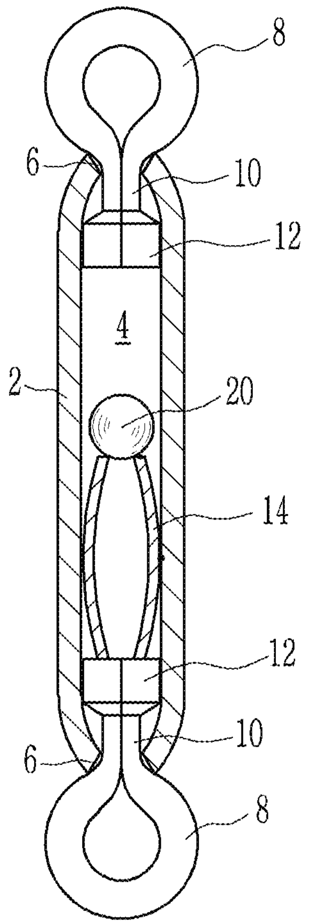
FIG. 3 is a cross-sectional structural diagram of a second embodiment related to a fishing swivel with an internal rattle of the present disclosure.

FIG. 3 is a diagram illustrating a second embodiment related to the fishing swivel with an internal rattle of the present disclosure, and illustrates an example in which one bead 20 is additionally built-in in the space 4 where the tubular body 14 is built-in in the structure illustrated in FIG. 2 and mounted on the outside of the tubular body 14. In this embodiment, one bead 20 is made of stainless steel.

In this way, the structure in which the tubular body 14 and the bead 20 exist simultaneously in the space 4 of the main body 2 causes three types of collision sounds to occur between the hammer 12 and the tubular body 14, between the hammer 12 and the bead 20, and between the tubular body 14 and the bead 20 during the action of the fishing rod, and the collision sounds blend together to cause wave interference, thereby producing the considerable volume of sound.

Therefore, it has the same advantage as the above-described embodiment because it has the effect of attracting fish with sound without using a separate existing rattle during fishing.

Figure 4:
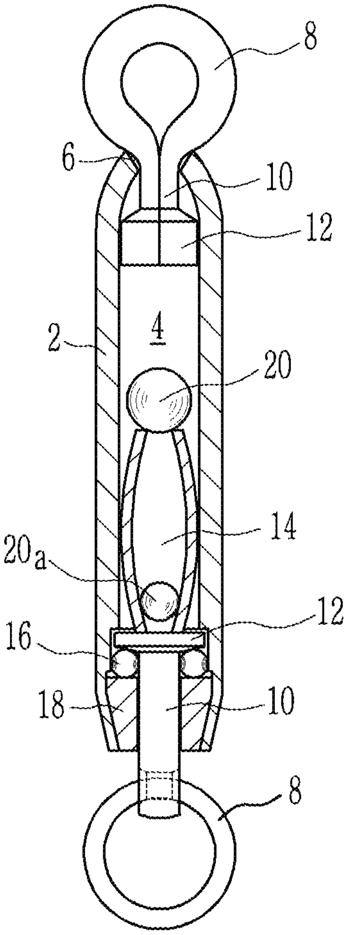
FIG. 4 is a cross-sectional structural diagram illustrating a modified example of the second embodiment related to the fishing swivel with an internal rattle of the present disclosure.

FIG. 4 is a diagram illustrating a modified example of the second embodiment related to the fishing swivel with an internal rattle of the present disclosure, and illustrates an example in which one inner bead 20*a* is additionally included inside the tubular body 14 in the configuration of the fishing swivel illustrated in FIG. 3, and another ring means 8 is supported by a ball bearing manner. In this embodiment, the bead 20 is made of stainless steel, and the inner bead 20*a* is made of tungsten.

In this configuration where the bead 20, the tubular body 14, and the inner bead 20*a* therein are arranged in the space 4 of the main body 2, four types of collision sounds occur between the hammer 12 and the tubular body 14, between the bead 20 and the tubular body 14, between the tubular body 14 and the inner bead 20*a*, and between the hammer 12 and the inner bead 20*a* during the action of the fishing rod, and the collision sounds blend together to cause the wave interference, thereby generating the considerable volume of sound.

Therefore, the effect of attracting fish with sound during fishing and the effect of preventing a fishing line from getting backlashed by the ball bearing are excellent even without separately packing the conventional rattle with a fishing tool, so it is suitable for fishing large species of fish.

Figure 5:
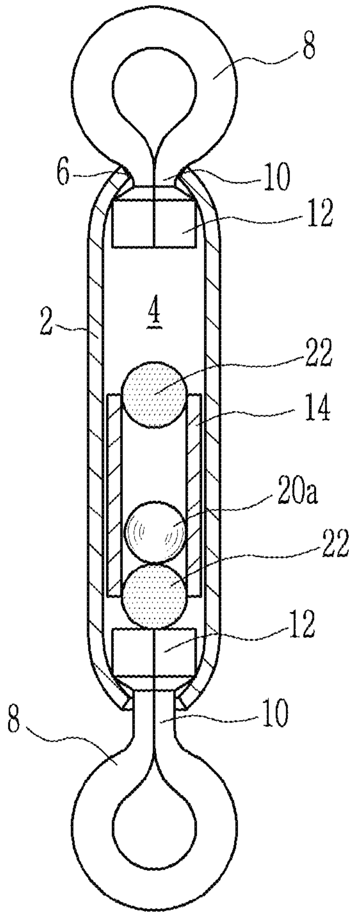
FIG. 5 is a cross-sectional structural diagram of a third embodiment related to a fishing swivel with an internal rattle of the present disclosure.

FIG. 5 is a diagram illustrating a third embodiment related to the fishing swivel with an internal rattle of the present disclosure. Unlike the tubular body 14 illustrated in the first embodiment described above, this embodiment has a structure in which one inner bead 20*a* is built-in inside, and both sides of the tubular body 14 are closed by a sealant 22. In this embodiment, the sealant 22 employs a metal ball. Also, in this embodiment, the inner bead 20*a* is made of tungsten.

The fishing swivel with an internal rattle of this configuration causes two types of collision sounds to be generated between the two hammers 12 and the two sealant 22 made of the corresponding metal balls, and between the two sealant 22 of the tubular body 14 and the inner bead 20*a* during the action of the fishing rod, and the two collision sounds blend together to cause the wave interference, thereby generating the considerable volume of sound.

Therefore, there is an effect of attracting fish with sound during fishing even without separately packing the existing rattle for the fishing tool, so there is the same advantage as the above-described embodiment.

Figure 6:
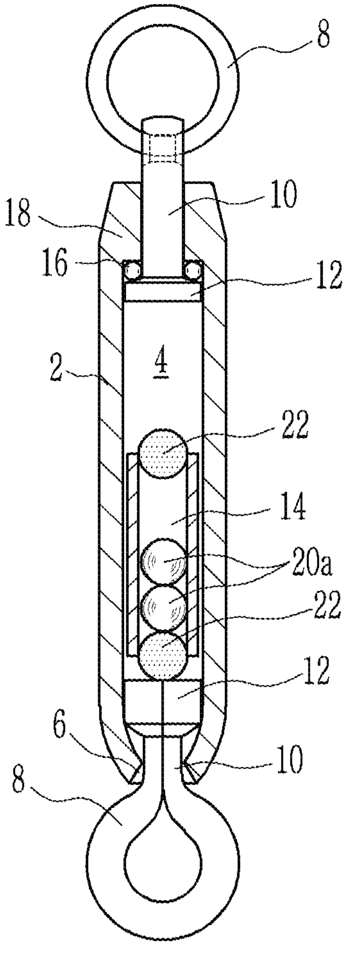
FIG. 6 is a cross-sectional structural diagram illustrating a modified example of the third embodiment related to the fishing swivel with an internal rattle of the present disclosure.

FIG. 6 is a diagram illustrating a modified example of the third embodiment related to the fishing swivel with an internal rattle of the present disclosure. This embodiment is configured to accommodate a pair of inner beads 20*a* inside the tubular body 14 compared to the structure illustrated in FIG. 5, and there is a difference in that the neck 10 of one ring means 8 is formed as the retainer 18 integral with the main body 2, thereby supporting the ball 16 together with the hammer 12, thereby forming a ball bearing. In this embodiment, the pair of inner beads 20*a* are made of plastic, i.e., polyacetal resin.

The fishing swivel with an internal rattle of this configuration generates three types of collision sounds between the outer side of the two hammers 12 and the sealant 22, between the inner side of the sealant 22 in the tubular body 14 and a pair of beads 20*a*, and between the pair of beads 20 during the action of the fishing rod, and the collision sounds blend together to cause the wave interference, thereby producing the considerable volume of sound.

Therefore, it is possible to obtain the effect of attracting fish with sound even without separately preparing the existing rattle for the fishing tool, and therefore, the same advantage as the above-described embodiment is obtained.

Figure 7:
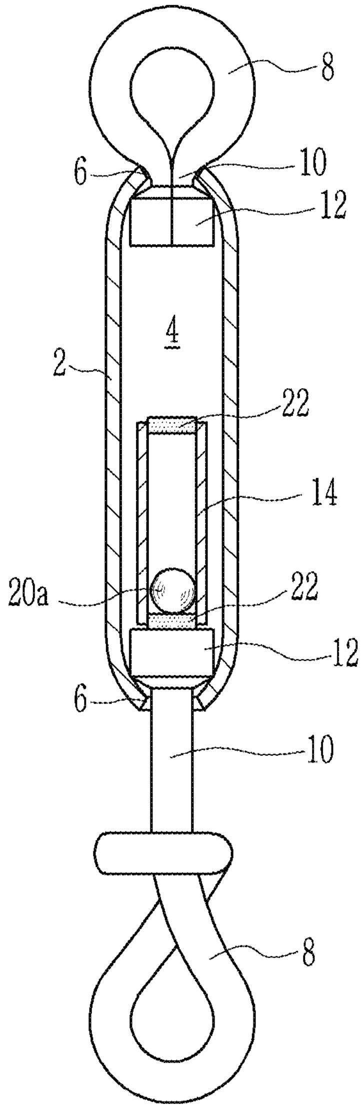
FIG. 7 is a cross-sectional structural diagram illustrating another modified example of the third embodiment related to the fishing swivel with an internal rattle of the present disclosure.

FIG. 7 is a diagram illustrating another modified example of the third embodiment related to the fishing swivel with an internal rattle of the present disclosure.

This embodiment shows an example in which one inner bead 20*a* is built-in in the tubular body 14, and a polyacetal resin among thermoplastic synthetic resins is used as the sealant 22 at both ends. In this embodiment, the inner bead 20*a* is made of ceramic.

The sealing work of both ends of the tubular body 14 using the polyacetal resin is easy because it is a hot pressurization of the synthetic resin, and since its properties are close to metal, it produces a sound like metal hitting whenever it collides with the hammer 12 and the inner bead 20*a*.

Meanwhile, in this embodiment, one of the ring means 8 may be formed as a snap loop. The snap loop is not limited to the form illustrated, and may be adopted regardless of the form when it is generally used in the fishing field, and this only facilitates the attachment of the lure.

The fishing swivel with an internal rattle of this configuration generates two types of collision sounds due to contact between the outer surface of the sealant 22 on both sides and between the inner surface of the sealant 22 and the inner bead 20*a* in the tubular body 14 during the action of the fishing rod, and the collision sounds blend together to cause the wave interference, thereby producing the considerable volume of sound.

Therefore, even when the existing rattle is omitted from the fishing tool, the effect of attracting fish with sound may be obtained, so there is the same advantage as the above-described embodiment.

Figure 8:
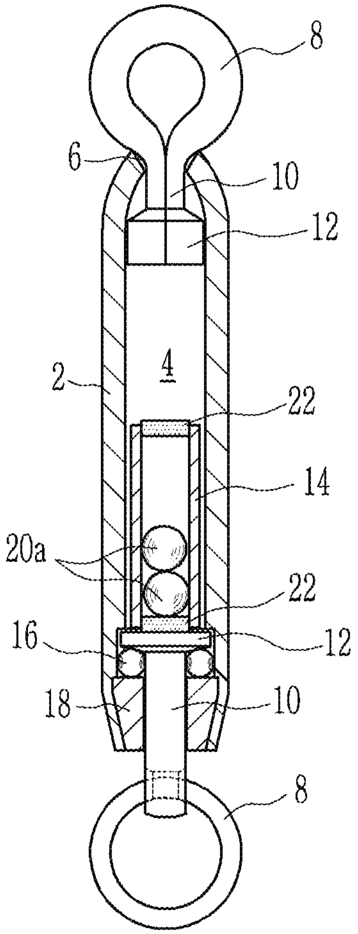
FIG. 8 is a cross-sectional structural diagram illustrating a fourth embodiment related to a fishing swivel with an internal rattle of the present disclosure.

FIG. 8 is a diagram illustrating a fourth embodiment related to a fishing swivel with an internal rattle of the present disclosure. In this embodiment, the sealant 22 at both ends of the tubular body 14 is formed by hot-pressing the polyacetal resin, similar to the embodiment of FIG. 7, but differs in that inner beads 20*a* are built-in in pairs inside the tubular body 14, and one ring means 8 is supported by the ball bearing. In this embodiment, one pair of inner beads 20*a* is made of tungsten and stainless steel.

The fishing swivel with an internal rattle of this configuration generates three types of collision sounds due to contact between the outer surfaces of both hammers 12 and both sealants 22, between the pair of inner beads 20*a* in the tubular body 14 and the corresponding inner surfaces of the sealants 22, and between the pair of inner beads 20*a* during the action of the fishing rod, and the collision sounds blend together to cause the wave interference, thereby producing the considerable volume of sound, and further, the ball bearing method provides an excellent effect of preventing the fishing line from getting backlashed, making it suitable for fishing targeting large fish.

Therefore, even when the existing rattle is omitted from the fishing tool, the effect of attracting fish with sound may be obtained, so there is the same advantage as the above-described embodiment.

Figure 9:
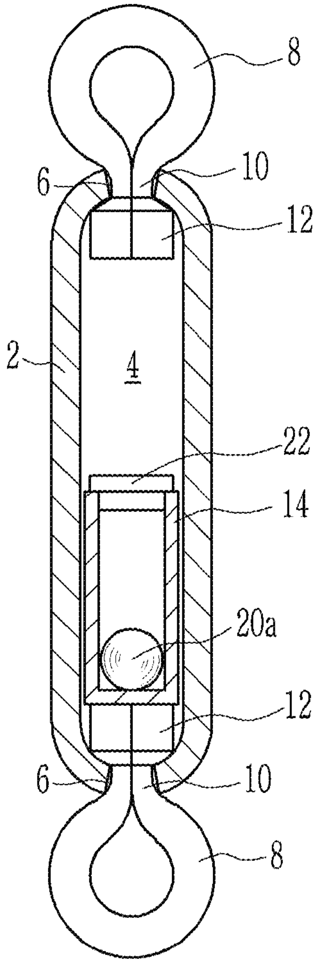
FIG. 9 is a cross-sectional structural diagram illustrating a fifth embodiment related to a fishing swivel with an internal rattle of the present disclosure.

FIG. 9 is a diagram illustrating a fifth embodiment related to a fishing swivel with an internal rattle of the present disclosure.

In this embodiment, the tubular body 14 including one inner bead 20*a* is made of a bottomed injection-molded product, and an opening at one end thereof is configured to have a cap that is also injection-molded as the sealant 22 and is ultrasonically bonded. In this embodiment, the inner bead 20*a* is made of plastic.

The bottomed injection-molded tubular body 14 is suitable for manufacturing a swivel with a small inner diameter, and similar to the fishing swivel with an internal rattle of this configuration, two types of collision sounds generated by contact between one hammer 12 and the bottom of the tubular body 14, or the sealant 22 made of a cap and between the bottom and the inner bead 20*a* inside the tubular body 14, or between the inner surface of the cap made of the sealant 22 and the inner bead 20*a* during the action of the fishing rod blend together to cause the wave interference, thereby producing the considerable volume of sound. Therefore, even when the existing rattle is packed separately in the fishing tool, it is possible to obtain the effect of attracting fish with sound, so there is the same advantage as the above-described embodiment.

Figure 10:
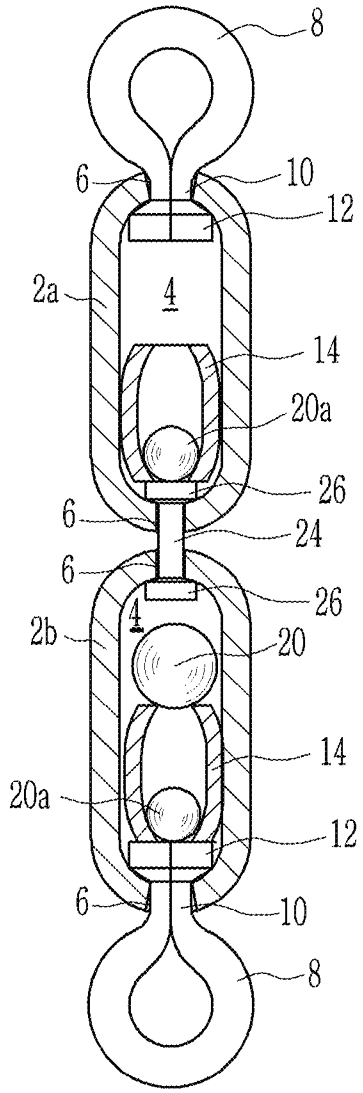
FIG. 10 is a cross-sectional structural diagram illustrating a sixth embodiment related to a fishing swivel with an internal rattle of the present disclosure.

FIG. 10 is a diagram illustrating a sixth embodiment related to a fishing swivel with an internal rattle of the present disclosure.

This embodiment shows a configuration in which two main bodies 2*a* and 2*b* are connected by a link 24, the barrel-shaped tubular body 14 in which one inner bead 20*a* is built-in is provided in one main body 2*a*, the barrel-shaped tubular body 14 in which the inner bead 20*a* is built-in is provided in the other main body 2*b* connected by the link 24, and the bead 20 is built-in together in the space 4 outside the main body.

In the illustrated example, the tubular body 14 is in a form in which both ends are open, similar to the first embodiment described above.

In addition, both ends of the link 24 that extends inwardly through the through hole 6 of each main body 2*a* and 2*b* and is supported by a shaft are each formed as a hammer 26.

The fishing swivel with an internal rattle of this configuration generates, in one main body 2*a*, three types of collision sounds generate between the hammer 12 of the ring means 8 and the tubular body 14, between the hammer 26 of the link 24 and the tubular body 14, and between the inside of the tubular body 14 and the inner bead 20*a* during the action of the fishing rod, and at the same time, generates, in the other main body 2*b*, four types of collision sounds generated by contact between the hammer 26 of the link 24 and the bead 20, between the tubular body 14 and the bead 20, and between the tubular body 14 and the inner bead 20*a*, and between the tubular body 14 and the hammer 12 of the inner bead 20*a* and the ring means 8, and the collision sounds blend together to cause the wave interference, thereby producing the considerable volume of sound. Therefore, even when the existing rattle is omitted from the fishing tool, the effect of attracting fish with sound may be obtained, so there is the same advantage as the above-described embodiment.

Figure 11:
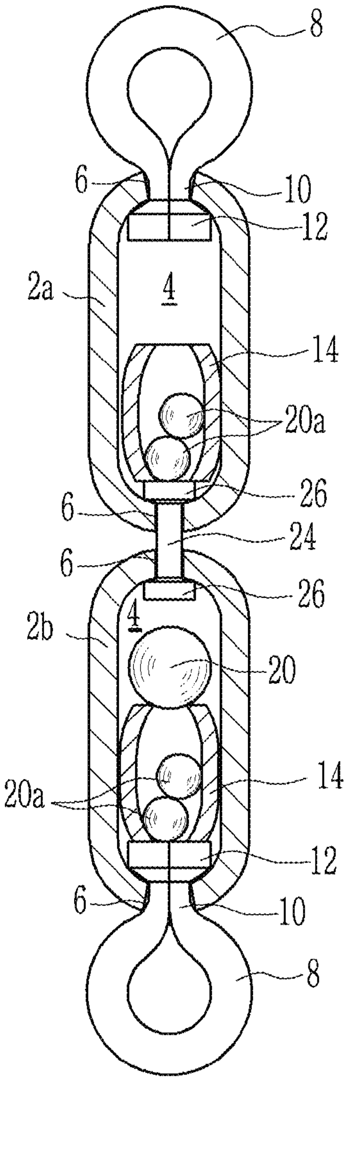
FIG. 11 is a cross-sectional structural diagram illustrating a modified example of a sixth embodiment related to the fishing swivel with an internal rattle of the present disclosure.

FIG. 11 is a diagram illustrating a modified example of a sixth embodiment related to the fishing swivel with an internal rattle of the present disclosure.

This embodiment also shows a configuration in which two main bodies 2*a* and 2*b* are connected by the link 24, and shows a configuration in which one main body 2*a* has the barrel-shaped tubular body 14 in which the inner bead 20*a* are built-in in pairs, and the other main body 2*b* connected by the link 24 has the barrel-shaped tubular body 14 in which the inner bead 20 are built-in in pairs and the bead 20 is built-in in the space 4 outside the main body. In this example as well, both ends of the link 24 are each formed by the hammer 12.

The fishing swivel with an internal rattle of this configuration produces four types of collision sounds due to the contact between the hammer 12 of the ring means 8 and the tubular body 14, between the hammer 26 of the link 24 and the tubular body 14, between the tubular body 14 and the pair of inner beads 20*a*, and between both the inner beads 20 on one main body 2*a*, and on the other main body 2*b*, between the hammer 26 of the link 24 and the bead 20 of the space 4, between the tubular body 14 and the bead 20 of the space 4, between the tubular body 14 and the pair of inner beads 20*a*, and between the inner beads 20*a* during the action of the fishing rod, and the collision sounds blend together to cause the wave interference, thereby producing the considerable volume of sound. Therefore, even when the existing rattle is omitted from the fishing tool, the effect of attracting fish with sound may be obtained, so there is the same advantage as the above-described embodiment.

In the above-described embodiment, the synthetic resin constituting the tubular body may be provided as one selected from the group consisting of ABS resin, polycarbonate, polyvinyl chloride, impact-resistant polystyrene, 6-nylon, polypropylene, high-density polyethylene, polyacetal resin, and polytetrafluoroethylene.

Figure 12:
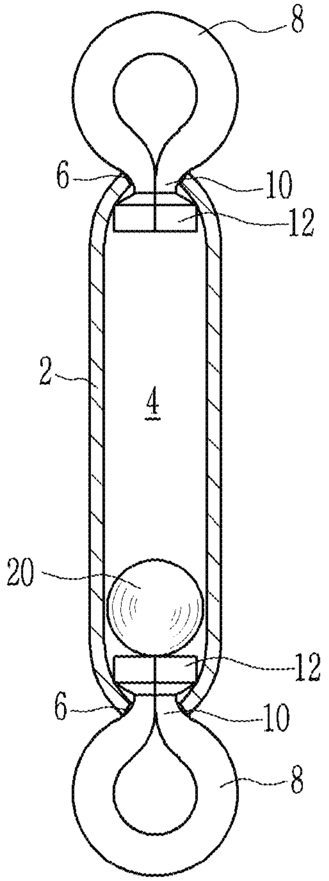
FIG. 12 is a cross-sectional structural diagram illustrating a seventh embodiment related to a fishing swivel with an internal rattle of the present disclosure.

FIG. 12 is a diagram illustrating a seventh embodiment related to a fishing swivel with an internal rattle of the present disclosure.

The main body 2 of the illustrated fishing swivel has the space 4 inside, both ends thereof are formed with the through holes 6 that axially support the neck 10 of the ring means 8, and the space 4 has a structure in which one bead 20 is built-in so as to move freely only in the axial direction. In this embodiment, the bead 20 is made of stainless steel.

The fishing swivel with an internal rattle of this configuration generates the considerable amount of noise (rattling sound) when the bead 20 moves axially inside the main body 2 during the action of the fishing rod, and collides with the hammer 12 of the ring means 8 that they encounter every time, thereby attracting fish. Therefore, even when the existing rattle is omitted from the fishing tool, the effect of attracting fish with sound may be obtained, so there is the same advantage as the above-described embodiment.

In relation to each of the above-described embodiments, it is preferable that the ratio of the outer diameter of the tubular body 14 to the inner diameter of the main bodies 2, 2*a*, and 2*b*, or the ratio of the outer diameter of the bead 20, and the ratio of the outer diameter of the bead 20 to the inner diameter of the tubular body 14 be set so as to exhibit a desirable rattling action.

Table 1 below presents numerical values related to the inner diameter of the main bodies 2, 2*a*, and 2*b*, the outer diameter of the tubular body 14, and the outer diameter of the beads 20 and 20*a* set in each embodiment, thereby indicating a desirable ratio relationship; however, the present disclosure is not necessarily limited to this ratio.

TABLE 1

| | B (mm) | | | C (mm) | | | D (mm) | | | | E (%) | | |
|---|---|---|---|---|---|---|---|---|---|---|---|---|---|
| A | B1 | B2 | B3 | C1 | C2 | C3 | D1 | D2 | D3 | D4 | E1 | E2 | E3 |
| 1 | 6.6 | 4.9 | 30 | 4.4 | 3.2 | 17 | — | — | — | — | 0.9 | — | 0.57 |
| 1-1 | 6.2 | 4.9 | 26 | 4.4 | 3.2 | 16 | — | — | — | — | 0.9 | — | 0.62 |
| 2 | 4.4 | 3.2 | 22 | 2.8 | 2 | 12 | — | 1.6 | — | — | 0.88 | 0.8 | 0.55 |
| 2-2 | 7.2 | 3.4 | 29.3 | 2.8 | 2 | 12 | 1.6 | 1.8 | — | — | 0.82 | 0.9 | 0.41 |
| 3 | 5.7 | 4.3 | 26.5 | 3.8 | 2.8 | 15 | 2.5 | — | — | — | 0.88 | 0.89 | 0.57 |
| 3-1 | 8.3 | 4.4 | 34.2 | 4 | 2.8 | 15 | — | — | 2.5 | — | 0.9 | 0.89 | 0.44 |
| 3-2 | 6.3 | 4.7 | 28.5 | 4.2 | 3 | 16 | — | — | — | 2.5 | 0.89 | 0.83 | 0.56 |
| 4 | 9.2 | 4.8 | 37.7 | 4 | 2.8 | 15 | 2.5 | 2.5 | — | — | 0.83 | 0.89 | 0.4 |
| 5 | 3.4 | 2.7 | 19 | 2.5 | 1.8 | 11.5 | — | — | 1.6 | — | 0.93 | 0.88 | 0.6 |
| 7 | 4.1 | 2.9 | 20 | 2.6 | 1.8 | 11.5 | — | 2.8 | — | — | 0.9 | — | 0.58 |

☞ A: Embodiment

B: Main body specification B1: Outer diameter B2: Inner diameter B3: Full length C: Tubular body specification C1: Outer diameter C2: Inner diameter C3: Full length D: Bead specification D1: Tungsten D2: Stainless steel D3: Plastic D4: Ceramic E: Ratio value E1: C1/B2 E2: D/C2 E3: C3/B3

In the above Table 1, samples related to the sixth embodiment and its modifications are omitted.

From the above Table 1, it may be seen that the outer diameter of the tubular body relative to the inner diameter of the main body is 0.82 to 0.93, the diameter of the bead relative to the inner diameter of the tubular body is 0.8 to 0.9, and the full length of the tubular body relative to the full length of the main body is 0.4 to 0.6.

The samples of each of the above-described embodiments and modifications were connected to the fishing line and the sound was measured while shaking them up and down in water. The measurement was performed using reason TC4013 of beijing zhihong hengtuo technology Co., LTD. as an auditory means, and the collected auditory analysis was performed using SignalLAB.EAR Installer of Wuhan Xingge Technology Co., Ltd.

The results of the auditory analysis are illustrated in Table 2 below as the volume (dB) for each embodiment.

TABLE 2

| Embodiment | Once | Twice | Three times | Four times | average(dB) |
|---|---|---|---|---|---|
| 1 | 64 | 66 | 59 | 60 | 62 |
| 1-1 | 64 | 67 | 58 | 61 | 63 |
| 2 | 66 | 68 | 65 | 66 | 66 |
| 2-1 | 69 | 71 | 70 | 71 | 70 |

TABLE 2-continued

| Embodiment | Once | Twice | Three times | Four times | average(dB) |
|---|---|---|---|---|---|
| 3 | 81 | 79 | 78 | 77 | 79 |
| 3-1 | 79 | 80 | 76 | 77 | 78 |
| 3-2 | 75 | 76 | 72 | 74 | 74 |
| 4 | 72 | 76 | 74 | 73 | 74 |
| 4-1 | 71 | 69 | 70 | 71 | 70 |
| 5 | 64 | 59 | 59 | 53 | 59 |
| 7 | 69 | 67 | 65 | 67 | 67 |
| Commercial product | 66 | 66 | 64 | 66 | 66 |

As may be seen from the above Table 2, the fishing swivel with an internal rattle related to the present disclosure had the loudest sound in the samples related to the third and fourth embodiments, followed by the seventh embodiment, and the first, second, and fifth embodiments showed somewhat lower sound. However, since these results are related to the specifications and materials of the main body, tubular body, and beads, it is difficult to determine which one is superior, but it may be confirmed that the sound generated by each of them is not much lower than that of the existing commercially available rattle unit.

Therefore, even with the fishing swivel with an internal rattle related to the present disclosure, it is possible to sufficiently attract fish through the sound generated by itself during fishing, so it is possible to expect the effect of attracting fish by the rattle without having the existing rattle unit.

As described above, the present disclosure has illustrated and described preferred embodiments, but it should be understood that the disclosure does not limit the present disclosure through this disclosure, but rather intends to encompass all modifications and alternative structures within the spirit and scope of the present disclosure.

<Description of symbols>

| | | |
|---|---|---|
| 2, 2a: Main body | 4: Space | 6: Through hole |
| 8: Ring member | 10: Neck | 12, 26: Hammer |
| 14: Tubular body | 16: Ball | 18: Retainer |
| 20: Bead | 20a: Inner bead | 22: Sealant |
| 24: Link | | |

What is claimed is:

1. A fishing swivel with an internal rattle, comprising:

a hollow main body having through holes formed on both ends thereof and a space inside;

a tubular body axially movably built-in in the space of the main body; and a pair of ring means, each of which including a neck axially supported in each of the through holes on both ends of the main body and a hammer connected to the neck, and being rotatably connected to the main body, wherein the tubular body comprises a tubular container having a tubular space inside thereof and an inner bead movably built-in in the tubular space of the tubular container, wherein the tubular body is configured to axially move inside the main body and collide with the hammer of the ring means and the inner bead is configured to move in the tubular space to produce a sound during casting and action in fishing.

2. The fishing swivel of claim 1, wherein:

in the pair of ring means, one neck or both necks are rotatably shaft-supported by a retainer installed around the through hole of the main body, and a ball bearing including a plurality of balls is interposed between the retainer and the hammer of the neck.

3. The fishing swivel of claim 1, wherein:

the tubular body is a barrel shape in which both ends are open and a diameter is gradually decreasing from a middle to both ends.

4. The fishing swivel of claim 1, wherein:

the tubular body comprises:

a bottomed injection-molded container having the tubular space and an opening on an end of the bottomed injection-molded container; and an injection-molded cap sealing the opening by ultrasonic welding to confine the inner bead in the tubular space.

5. The fishing swivel of claim 1, wherein the bead built-in inside the tubular body is made of one selected from tungsten, stainless steel, plastic, and ceramic.

6. The fishing swivel of claim 1, wherein the tubular body is made of one selected from the group consisting of ABS resin, polycarbonate, polyvinyl chloride, impact-resistant polystyrene, 6 nylon, polypropylene, high-density polyethylene, polyacetal resin, and polytetrafluoroethylene.

* * * * *